US007784723B2

(12) United States Patent
Moore, III

(10) Patent No.: US 7,784,723 B2
(45) Date of Patent: Aug. 31, 2010

(54) LAYERED TAPE GUIDE SPOOL AND ALIGNMENT DEVICE AND METHOD

(75) Inventor: Marbert G. Moore, III, Katy, TX (US)

(73) Assignee: DeepFlex Inc., Houston, TX (US)

( * ) Notice: Subject to any disclaimer, the term of this patent is extended or adjusted under 35 U.S.C. 154(b) by 328 days.

(21) Appl. No.: 11/853,626

(22) Filed: Sep. 11, 2007

(65) Prior Publication Data

US 2009/0065630 A1  Mar. 12, 2009

(51) Int. Cl.
 B65H 55/00 (2006.01)
 B65H 39/16 (2006.01)
(52) U.S. Cl. .................... 242/160.2; 242/159; 242/166; 242/443.1; 242/444.3; 242/445.1
(58) Field of Classification Search .............. 242/433.4, 242/606, 443, 443.1, 444, 444.3, 445, 445.1, 242/447, 447.1, 160.2, 159, 166
See application file for complete search history.

(56) References Cited

U.S. PATENT DOCUMENTS

| | | | | | |
|---|---|---|---|---|---|
| 2,657,866 | A | * | 11/1953 | Lungstrom | 242/439.5 |
| 3,128,216 | A | * | 4/1964 | Reed | 156/190 |
| 3,322,291 | A | * | 5/1967 | Smith | 414/432 |
| 3,997,122 | A | * | 12/1976 | Helfand et al. | 242/160.2 |
| 4,013,102 | A | * | 3/1977 | DeLorean et al. | 138/144 |
| 4,175,992 | A | * | 11/1979 | Grawey | 156/143 |
| 4,197,348 | A | * | 4/1980 | Townsend | 428/377 |
| 4,346,550 | A | * | 8/1982 | Ferree | 57/10 |
| 4,461,429 | A | * | 7/1984 | Goekler et al. | 242/439.5 |
| 4,610,403 | A | * | 9/1986 | Goekler et al. | 242/439.5 |
| 4,830,694 | A | * | 5/1989 | Kanao | 156/143 |
| 5,225,019 | A | * | 7/1993 | Huvey | 156/173 |
| 5,517,812 | A | * | 5/1996 | Simmons | 57/18 |
| 5,533,690 | A | * | 7/1996 | Kline et al. | 242/547 |
| 5,589,019 | A | * | 12/1996 | Van Beersel et al. | 156/184 |
| 5,605,305 | A | * | 2/1997 | Picton | 242/608 |
| 5,871,171 | A | * | 2/1999 | Kenney et al. | 242/610.4 |
| 6,007,016 | A | * | 12/1999 | Helton | 242/531.1 |
| 6,098,913 | A | * | 8/2000 | Demore | 242/447.3 |

(Continued)

FOREIGN PATENT DOCUMENTS

JP  2002020001  1/2002

(Continued)

OTHER PUBLICATIONS blade. (n.d.). Dictionary.com Unabridged. Retrieved Mar. 10, 2010, from Dictionary.com website: http://dictionary.reference.com/browse/blade.*

(Continued)

Primary Examiner—Evan H Langdon
(74) Attorney, Agent, or Firm—Osha • Liang LLP

(57) ABSTRACT

A layered tape guide spool having a plurality of guide rods, each of which have a first and a second guide member. The gaps between adjacent guide rods and the gaps formed between the first and second guide members define a gap that urges the tape stacks together into a desirable rectangular shape. The resulting tape stacks are then wrapped onto a tubular core or onto existing layers on a tubular core.

20 Claims, 11 Drawing Sheets

U.S. PATENT DOCUMENTS

| | | |
|---|---|---|
| 6,491,779 B1 | 12/2002 | Bryant |
| 6,527,220 B2 * | 3/2003 | Weaver et al. ............... 242/603 |
| 6,612,516 B1 * | 9/2003 | Haines .................... 242/397.1 |
| 6,804,942 B2 | 10/2004 | Bryant |
| 7,073,978 B2 | 7/2006 | Bryant |
| 7,254,933 B2 | 8/2007 | Bryant et al. |
| 7,374,127 B2 * | 5/2008 | Gallagher et al. ........... 242/444 |
| 2003/0201360 A1 * | 10/2003 | Hill ............................ 242/443 |
| 2005/0082413 A1 * | 4/2005 | Hill ............................ 242/443 |
| 2009/0084886 A1 * | 4/2009 | Hunt .......................... 242/570 |
| 2010/0006692 A1 * | 1/2010 | Galgano et al. .......... 242/588.4 |

FOREIGN PATENT DOCUMENTS

| | | |
|---|---|---|
| KR | 200272493 | 4/2002 |

OTHER PUBLICATIONS

English Patent Abstract of JP2002020001 from esp@cenet, published Jan. 23, 2002 (1 page).

International Search Report dated Jan. 5, 2009 (6 pages).

International Preliminary Report on Patentability and Written Opinion of the Searching Authority issued for International Patent Application No. PCT/US2008/075971, mailed Mar. 25, 2010, 5 pages.

* cited by examiner

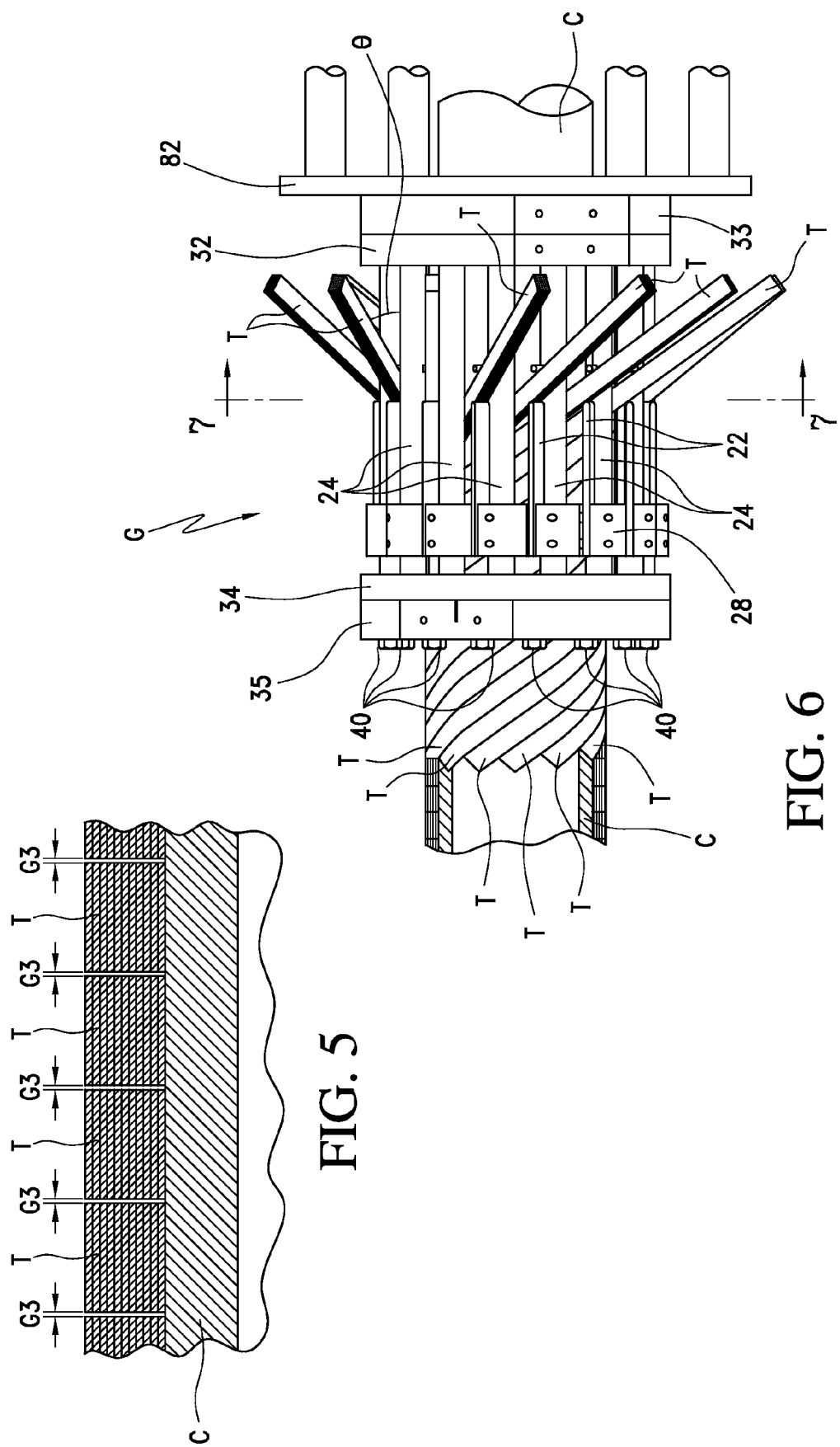

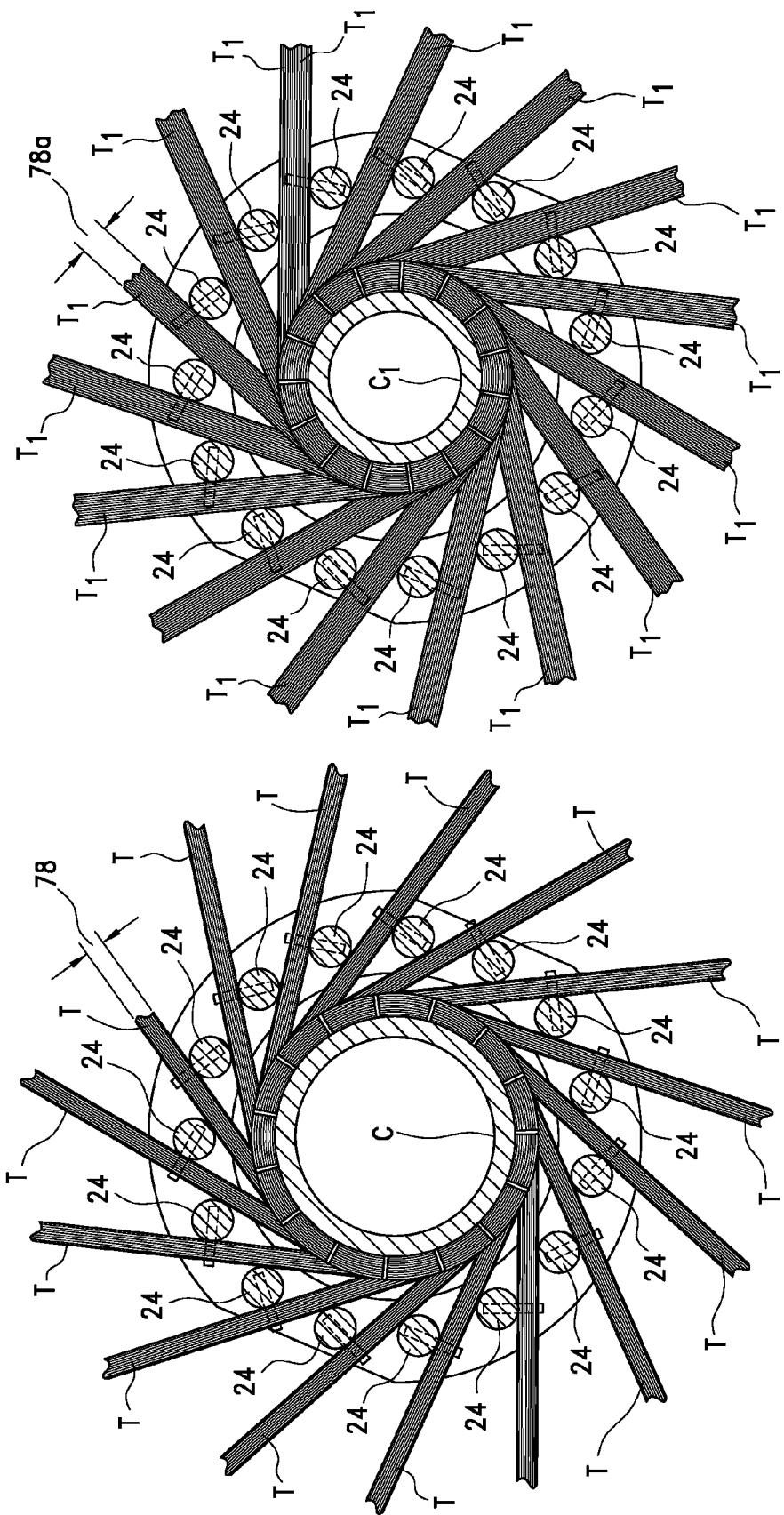

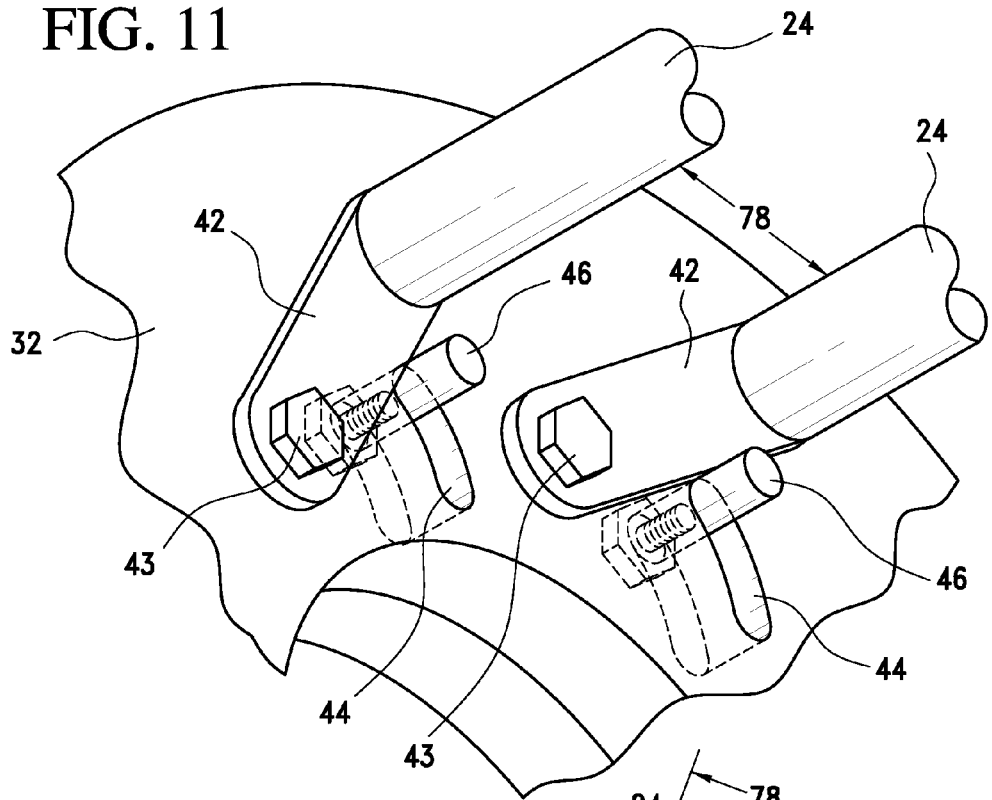
FIG. 11
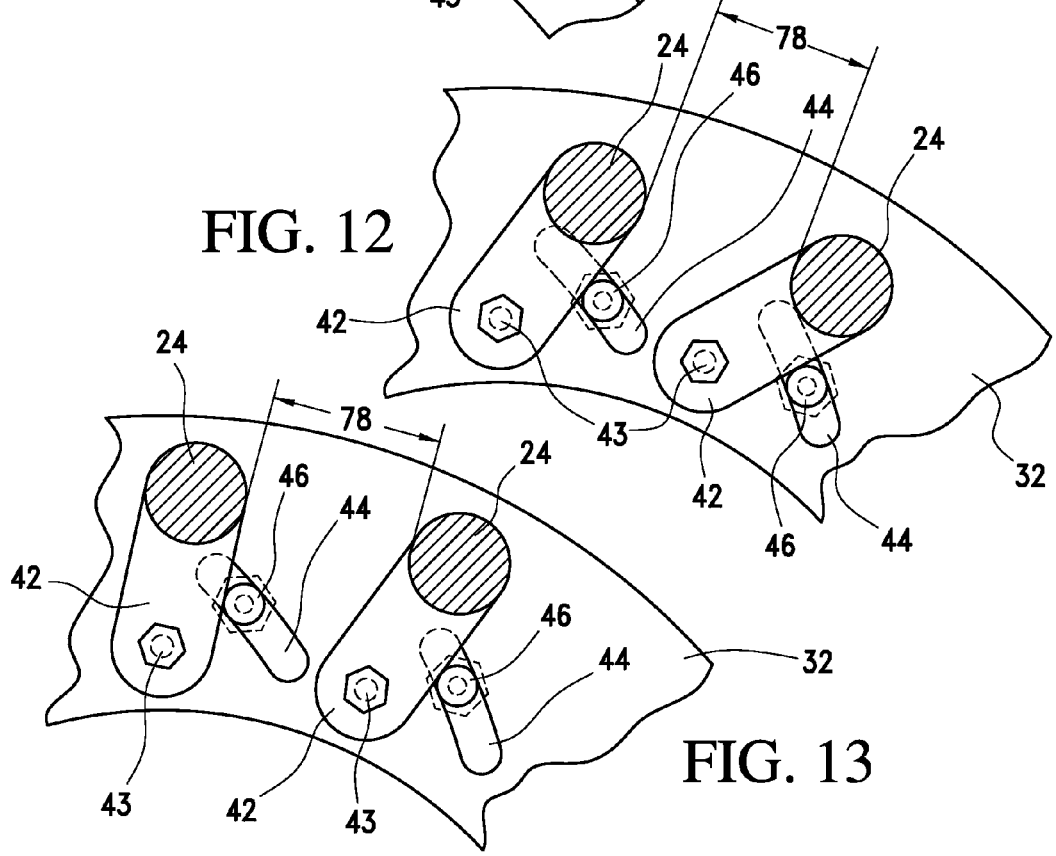
FIG. 12
FIG. 13

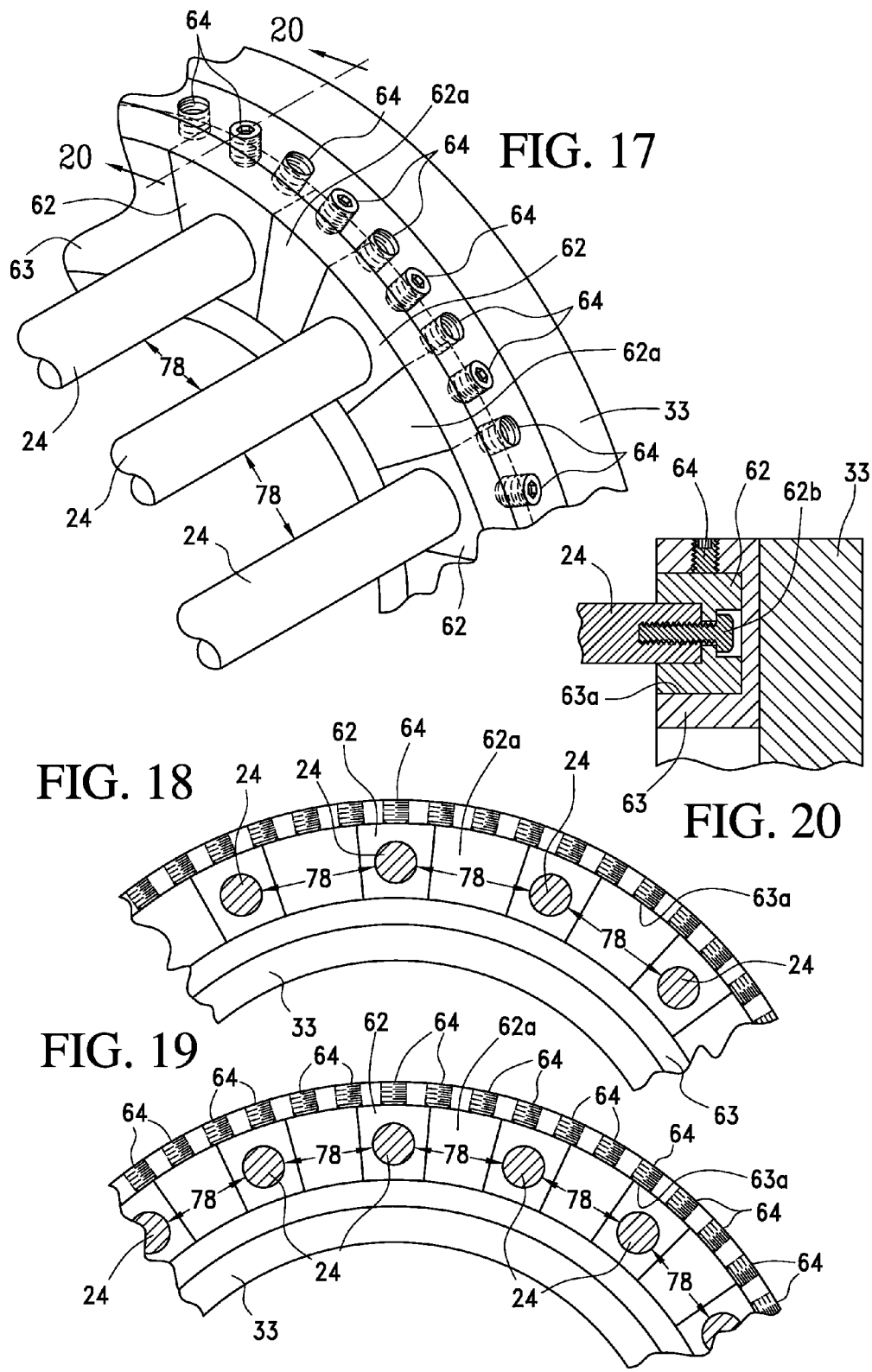

LAYERED TAPE GUIDE SPOOL AND ALIGNMENT DEVICE AND METHOD

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The field of the invention is an alignment and positioning device for use with stacks of flexible strips of material when constructing a composite tubular assembly.

2. Description of the Related Art

This is an improvement on the device used to manufacture the composite tubular assembly in the invention disclosed in U.S. Pat. Nos. 6,804,942 and 6,491,779, which are herein incorporated by reference.

Composite tapes, referred to in the industry as tape stacks, are formed from a plurality of thin tape strips. The tape stacks are then helically wound onto a tubular core. During the wrapping of the tape stacks, gaps can occur between adjacent tape stacks. The gaps can reduce the pressure integrity of the tubular core by potentially allowing pressure to extrude the tubular core through the gaps between the adjacent tape stacks.

The tape stacks can also become skewed or slurred such that the cross section of the tape stacks forms a parallelogram shape instead of a desirable rectangular shape. A parallelogram shape reduces the structural strength of the tubular core and can result in the failure of the tubular core during internal pressure loading.

Prior art gathering dies include a comb-like device that gathers the individual tapes together while wrapping the resulting tape stack on the tubular core or on top of an existing layer. The prior art gathering dies do not align the individual tapes and therefore the resulting tape stacks become skewed or slurred as they are being wrapped onto the tubular core or on top of an existing layer. Also, the prior art gathering dies do not provide desirable uniform spacing between the individual tape stacks. The problem can become more pronounced as the diameters of the tubular core becomes greater because additional tape stacks are required to cover the tubular core and to contain pressure within the tubular core.

BRIEF SUMMARY OF THE INVENTION

What is needed is an apparatus that provides a guide spool that aligns tape stacks during the winding of the tape stacks around a tubular core. The guide spool should maintain the tape stacks in an approximately uniform rectangular or square cross section at the point in time where the tape stacks approach the surface of the tubular core or the surface of underlying layers above the tubular core.

The guide spool should also maintain a uniform gap between adjacent tape stacks to provide maximum strength to the tubular core, or to layers on which the tape stacks are wound. This need can become especially great when laying down a burst layer onto a tubular core.

The device according to this invention comprises a plurality of guide rods that have a proximal and a distal end. The guide rods extend from a first rotatable flange member. The proximal end of the guide rods is positioned about an approximate circular shape on the first rotatable flange member. A first tape stack retaining member is positioned on each of the guide rods. Each of the tape stack retaining members is generally formed in a blade shape that has an end that extends away from the first rotatable flange member. A second tape stack retaining member is positioned on each of the guide rods and is separated from the end of each of said blades thereby forming a gap between the end of each of the blades and the retaining member in which the tape stacks pass.

The gap formed between the guide rods, the first tape stack retaining member and the second tape stack retaining member urges the tape stacks into a rectangular cross section, thereby preventing a skewed or slurred cross section shape.

A method of forming a guide spool for positioning tape stacks on a tubular member is disclosed, which comprises the steps of providing a plurality of guide rods having a proximal and a distal end, extending the distal end of the guide rods from a first rotatable flange member, positioning a first tape stack retaining member on each of the guide rods, extending an end of each of the first tape stack retaining members away from the first rotatable flange member; and positioning a second tape stack retaining member on each of the guide rods that is separated from the end of said first tape stack retaining member whereby a gap is formed between the end of each of the first tape stack retaining members and the second tape stack retaining member through which the tape stacks pass.

BRIEF DESCRIPTION OF THE DRAWINGS

FIG. 5 is a sectional view of adjacent tape stacks constructed from the present invention.

FIG. 6 is a side view of an embodiment of the present invention including tape stacks being applied to a tubular core.

FIG. 7 is a sectional view taken along the lines 7-7 in FIG. 6.

FIG. 7A is an alternative sectional view taken along the lines 7-7 in FIG. 6 in which the tubular core is smaller in diameter than the tubular core shown in FIG. 7.

FIG. 11 is a partial isometric view of an embodiment of the present invention that includes adjustable guide rod pivot members.

FIG. 12 is a partial top view of FIG. 11.

FIG. 13 is an alternative partial top view of FIG. 11.

FIG. 17 is a partial isometric view of an embodiment of the present invention that includes segmented members for adjusting the position and number of guide rods.

FIG. 18 is a partial top view of FIG. 17.

FIG. 19 is an alternative partial top view of FIG. 17.

FIG. 20 is a sectional view taken along the lines 20-20 in FIG. 17.

DETAILED DESCRIPTION OF THE INVENTION

Figure 1:
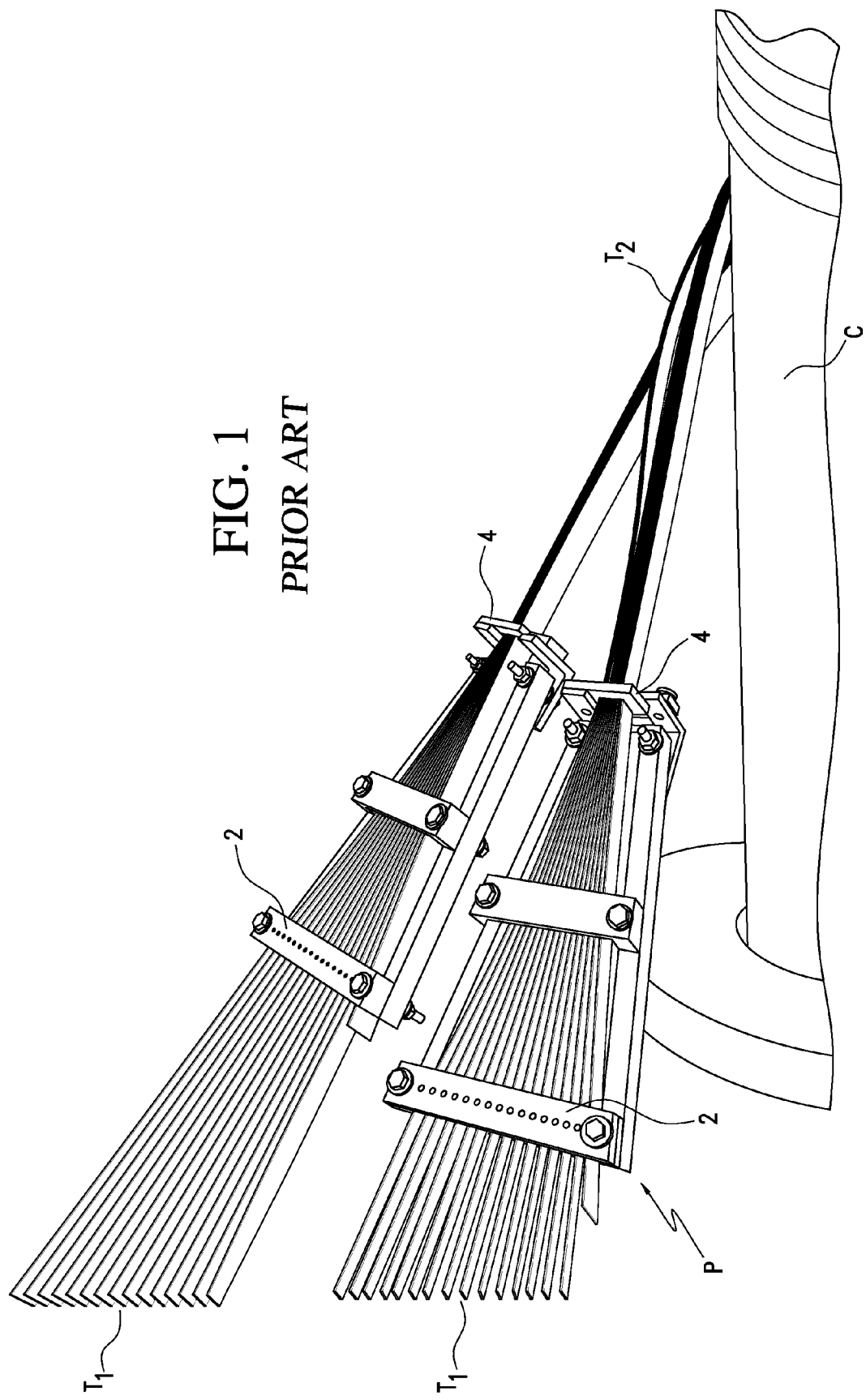
FIG. 1 is an isometric view of a prior art gathering die device.

Referring now to FIG. 1, the letter P refers generally to a prior art gathering die device. T1 refers to the individual tape layers, which are stacked together to form tape stacks T2. In prior art gathering die device P the individual tape layers T1 are combined with a comb device 2 and gathered together at the exit 4. The tape stacks T2 are wound onto the tubular core C.

Figure 2:
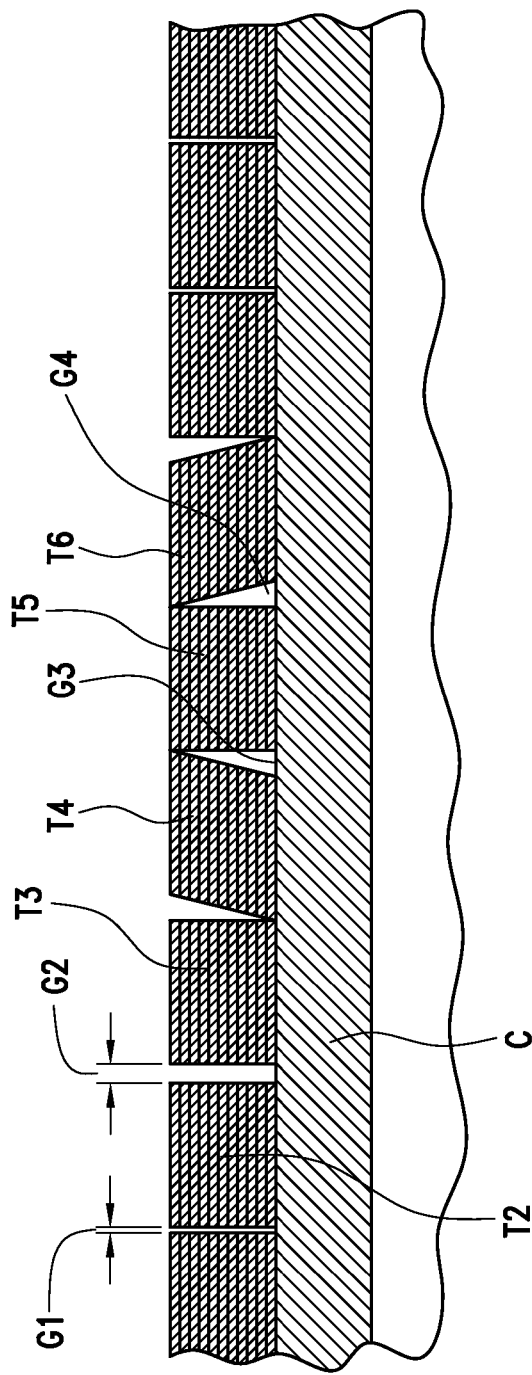
FIG. 2 is a cross sectional view of an example of the irregular spacing and skewed tape stacks produced with the prior art gathering die of FIG. 1.
Figure 3:
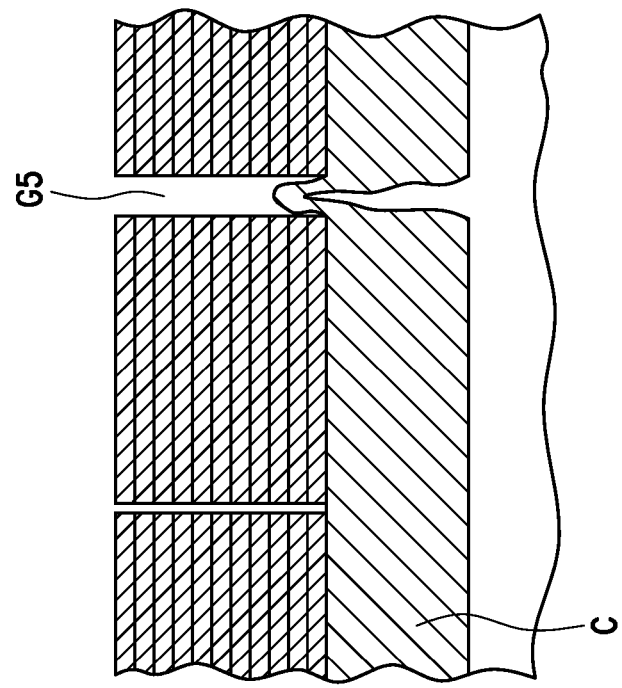
FIG. 3 is a cross sectional view of an example of a gap between adjacent tape stacks produced with the prior art gathering die of FIG. 1 and the resulting extruded tubular core.

The tape stacks T2 formed from the prior art gathering device P result in irregularly shaped tape stacks illustrated in FIG. 2 as T4 and T6. Both prior art tape stacks T4 and T6 are skewed into a parallelogram shape. The parallelogram shape is undesirable because the tape stacks T4 and T6 do not have uniform support along their thickness from the bottom layer to the top layer. Also, irregular gaps G1, G2, G3 and G4 are variously formed between tape stacks T2, T3, T4, T5 and T6. If the gaps become large enough, as shown in FIG. 3 at G5, the tubular core C can extrude between the gap G5 when pressure is applied inside of the tubular core C, resulting in the failure of the tubular core C.

Figure 4:
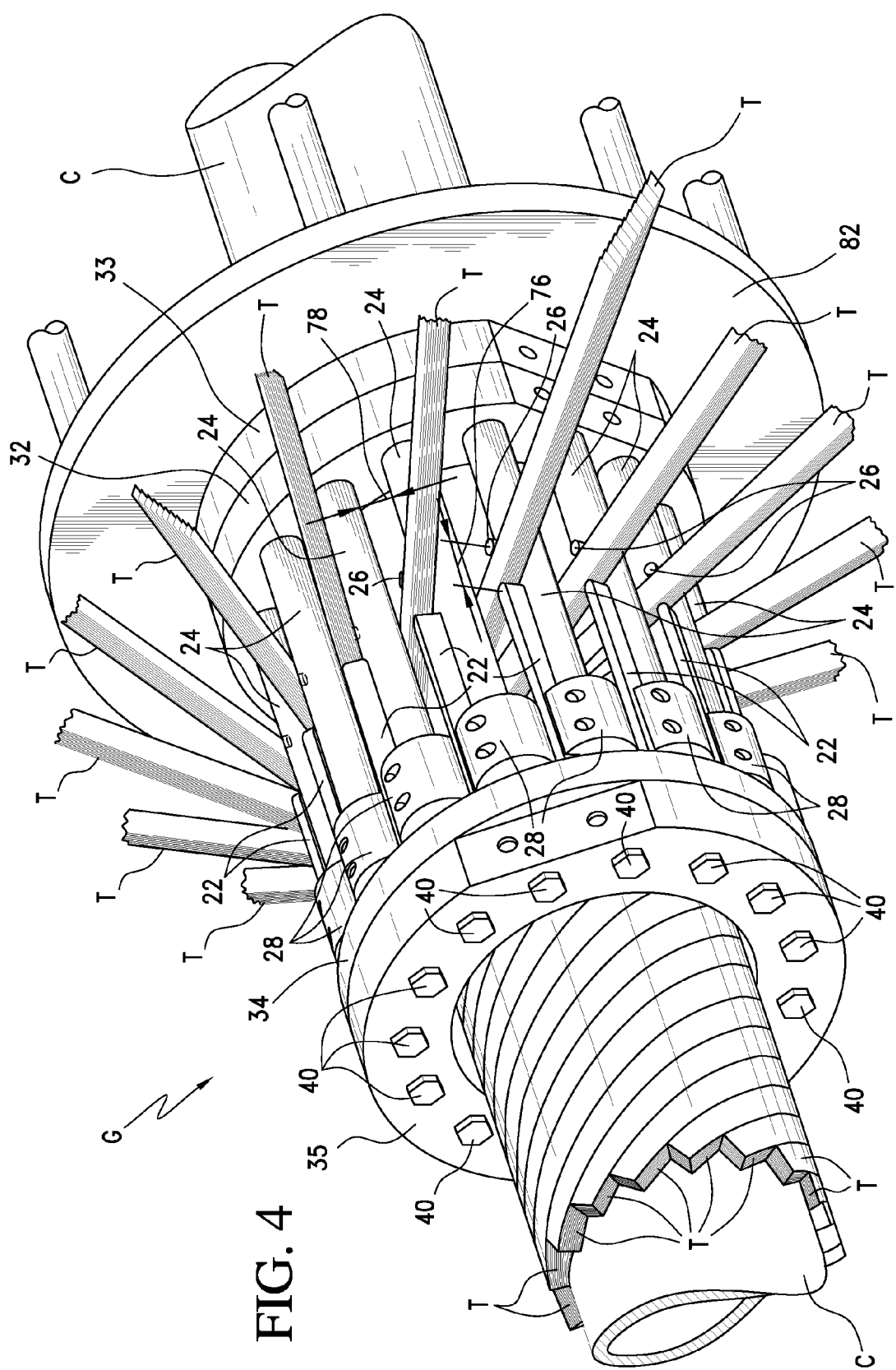
FIG. 4 is an isometric view of the present invention.

In FIG. 4, the inventive guide spool is shown generally as G. Guide rods 24 are positioned between the entry flange 32 and the exit flange 34. Guide collars 28 are positioned on the guide rods 24. Blades 22 or other tape stack retaining members are connected to the guide collars 28. Roll pins 26, or other tape stack retaining members, are positioned on the guide rods 24 approximately in line with the blades 22. Tape stacks T are shown entering the guide spool G in the gaps formed between the blades 22, the roll pins 26, and the upper and lower surfaces of adjacent guide rods 24. The gap 76 formed along the length of the guide rods 24 between the blades 22 and the roll pins 26 (best seen in FIG. 9) forces the individual layers of the tape stacks T to line up one on top of the other, thereby remaining in a rectangular shape at the time the tape stack T is wrapped onto the tape core C. It is also contemplated that other tape stack retaining members constructed to force the laminar tapes into a desired cross sectional shape can be used with the inventive device. Also, at times, a cross section other than a rectangle or square may be desired. By altering the spacing between the first and second tape stack retaining members, different cross sections, such as a parallelogram, can be obtained.

The gap 78 formed between the upper and lower surfaces of adjacent guide rods 24 (best seen in FIG. 9) causes the individual layers of the tape stacks T to be compressed together as they are wrapped onto the tubular core C. The gap 78 thus formed in the vertical direction can be increased by either reducing the diameter of the guide rods 24, increasing the distance of the guide rods 24 from the center of the guide spool G, changing the number of guide rods 24, or changing the diameter of the tubular core C. In FIG. 7A the tubular core C1 is shown as having a smaller diameter than the tubular core C in FIG. 7. The reduced diameter of the tubular core C1 increases the angle of the tape stack T1 as the tape stack T1 passes between guide rods 24. The increased angle results in a larger gap 78a compared to the gap 78 shown in FIG. 7. As a result, more layers of individual tapes, and a thicker overall tape stack T1 can be passed between adjacent guide rods 24. As the tape stacks T, T1 enter at a more perpendicular angle to the tubular core C, C1, the gaps 78, 78a between the upper and lower surfaces of adjacent guide rods 24 are increased, thereby imposing less compression on the tape stacks T or allowing thicker tape stacks T, T1 to pass between adjacent guide rods 24. The approach angle T (See FIG. 6) that the tape stacks T, T1 approach the core C, C1 may be a neutral angle, such as approximately 54 degrees, or it may be another desired approach angle.

FIG. 5 illustrates the resulting desirable uniform gaps G3 formed between the tape stacks T. The uniform gaps G3 are uniform because the tape stacks T are wrapped uniformly on the tubular core C as the tape stacks pass between the gaps 76, 78 of the guide spool G (Best seen in FIG. 9).

In FIGS. 7 and 7A the tape stacks T are shown with a uniform radial distribution about the tubular core C and C1. The uniform radial distribution results in a uniform wrapping of the tape stacks T, T1 on the tubular core C, C1 and also contributes to the uniform gaps G3 between adjacent tape stacks T, as shown in FIG. 5. The uniform wrapping and uniform gaps G3 between adjacent tape stacks T improves the integrity and strength of the layers of tape stacks T. The guide spool G may also be used to wrap tape stacks T uniformly on layers above the tubular core C and not just on the tubular core C itself.

Figures 8, 9:
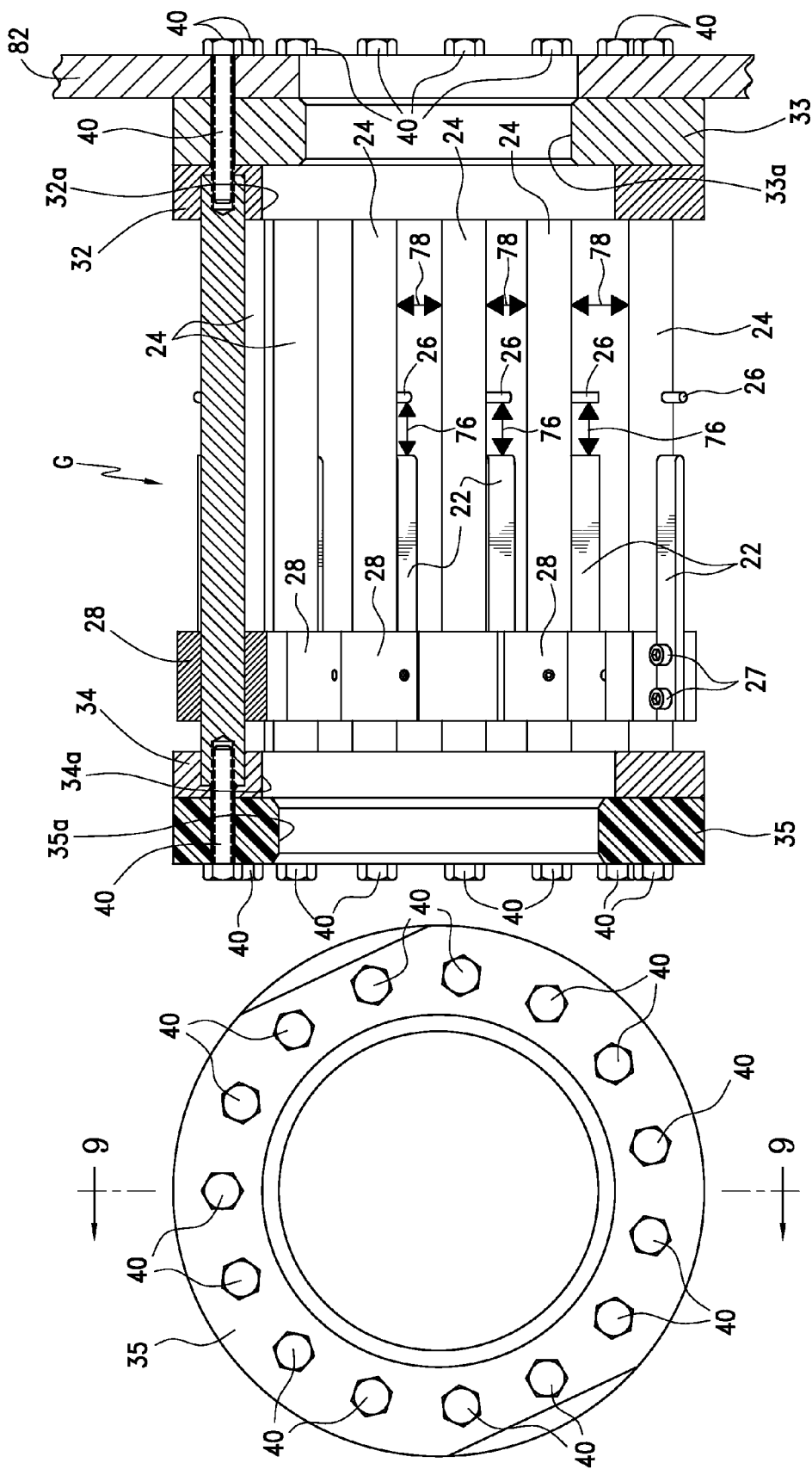
FIG. 8 is an end view of the exit end of an embodiment of the present invention.
FIG. 9 is a sectional view taken along the lines 9-9 in FIG. 8.
Figure 10:
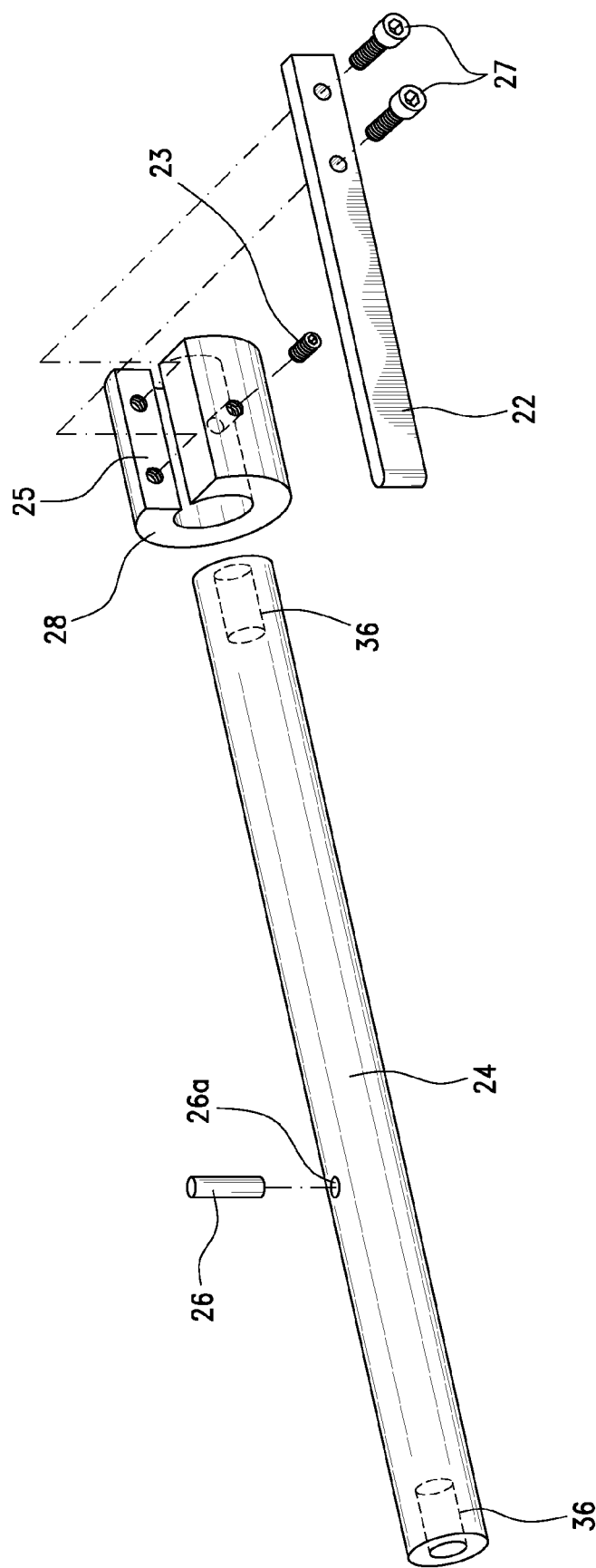
FIG. 10 is an assembly view of the guide rod and related parts of the present invention.

Referring now to FIGS. 8, 9 and 10, the guide rod assembly is shown and includes the guide rod 24, which is inserted into the guide rod collar 28. The guide rod collar is secured to the guide rod with a guide rod collar set screw 23, or other suitable securing means. The blade 22 is connected to guide rod collar face 25 with blade set screws 27 or other suitable fastener means. The roll pin 26 is typically press fit into a bore 26a in the guide rod 24. The roll pin 26 may also be provided with a threaded end that is threaded into a corresponding threaded hole in the position of the bore 26a.

As seen in FIG. 9, one end of each guide rod 22 is inserted into a bore in the exit flange 34 and secured to the exit flange 34 with guide rod mounting bolts 40. The opposite end of each guide rod 24 is inserted into a bore in the entry flange 32 and secured to the entry flange 32 with guide rod mounting bolts 40. Although the construction of the guide spool G is shown with an entry flange 32 and an exit flange 34, it is contemplated that a single flange could be used, together with the guide rods 24, blades 22, collars 28 and roll pins 26. It is also contemplated that pins may be substituted for the blades 22 such that containment is provided to tape stacks T between roll pins 26 and the blades 22 or containment pins, or other containment device to contain the tape stacks in a substantially uniform, rectangular configuration or other desired configuration.

During manufacturing, the tubular core C passes through the entry flange 32 and entry guide bushing 33 of the guide spool G and exits through the exit flange 34 and exit guide bushing 35 (See FIG. 6, for example). The bore 33a of the entry guide bushing 33 and the bore 35a of the exit guide bushing 35 are smaller in diameter than the bore 32a of the entry flange 32 and the bore 35a of the exit flange 35. The entry guide bushing 33 and exit guide bushing 35 are designed to center the tubular core C and by being constructed of a polymer material, such as for example, Delrin® acetal resin engineering plastic, provide a wear surface that the tubular core can pass through without damaging the surface of the tubular core C. The diameters of the bore 33a of the entry guide bushing 33 and bore 35a of the exit guide bushing can be changed to accommodate different sizes of tubular cores C. Because the guide spool G is also used to wrap layers on top of existing layers, the diameters of the bores 33a, 35a can be changed to accommodate the overall size of the tubular core C, including the extra thickness of any additional layers contained on the tubular core C.

The guide spool G is mounted to a winding machine (not shown), on the winding flange 82 to the entry flange 32 and the entry guide bushing 33. The guide rod mounting bolts 40 pass through the winder flange 82, and through the entry guide bushing 33, and are threaded into the guide rod threaded bores 36 in the ends of the guide rods 24.

As the tubular core passes through the guide spool G, tape stacks T, which have been fed from spools on the winding machine (not shown) to the guide spool G and pass through the gaps 76, 78 formed by adjacent guide rods 24, blades 22 and roll pins 26. Prior to reaching the guide spool G, the tape stacks are typically saturated with epoxy or other adhesive to bond the individual tapes together to form the tape stacks T. The tape stacks T are urged into a generally rectangular cross section as they pass through the gaps 76, 78 formed between the adjacent guide rods, the blades 22 and the roll pins 26. It would also be possible to urge the tape stacks T into a non-rectangular cross section by enlarging the openings formed between the adjacent guide rods 24, the blades 22 and the roll pins 26.

The inventive guide spool G can be used on various sizes of tubular cores T and with various thicknesses of tape stacks T. To accommodate larger diameter tubular cores C, or tubular cores C that are covered with existing layers, the guide rods 24 must be positioned far enough away from the tubular core T to allow the tubular core T and any layers to pass inside of the guide spool G. For example, FIGS. 7 and 7A show the relative position of the guide rods 24 to the position of the tubular core C and C1 and the tape stacks T and T1. Although the guide rods 24 can be installed on larger entry and exit flanges 32, 34, or on positions further away from the tubular core C or C1, an alternative configuration is illustrated in FIGS. 11-13. Each guide rod 24 (shown in FIGS. 11-13) is attached to a pivot arm 42. The pivot arm 42 rotates about the pivot bolt 43. The end of the pivot arm 42 on which the guide rod 24 is positioned contacts a pivot arm retaining bolt 46. The pivot arm retaining bolt 46 is secured in the pivot arm adjustment slot to position each guide rod 24 in a desired position relative to the outside of a tubular core C or the outer layers of a tubular core C. As each guide rod 24 is repositioned, it also changes the gap 78 between adjacent guide rods 24 thereby changing the allowable tape stack T thickness that can pass through the gap 78. Although the pivot arms 42 are shown assembled on the entry flange 32, the assembly of the pivot arms 42, together with the guide rods 24 is typically similarly assembled on the opposite end of the guide rods 24 on the exit flange 34.

Figure 14:
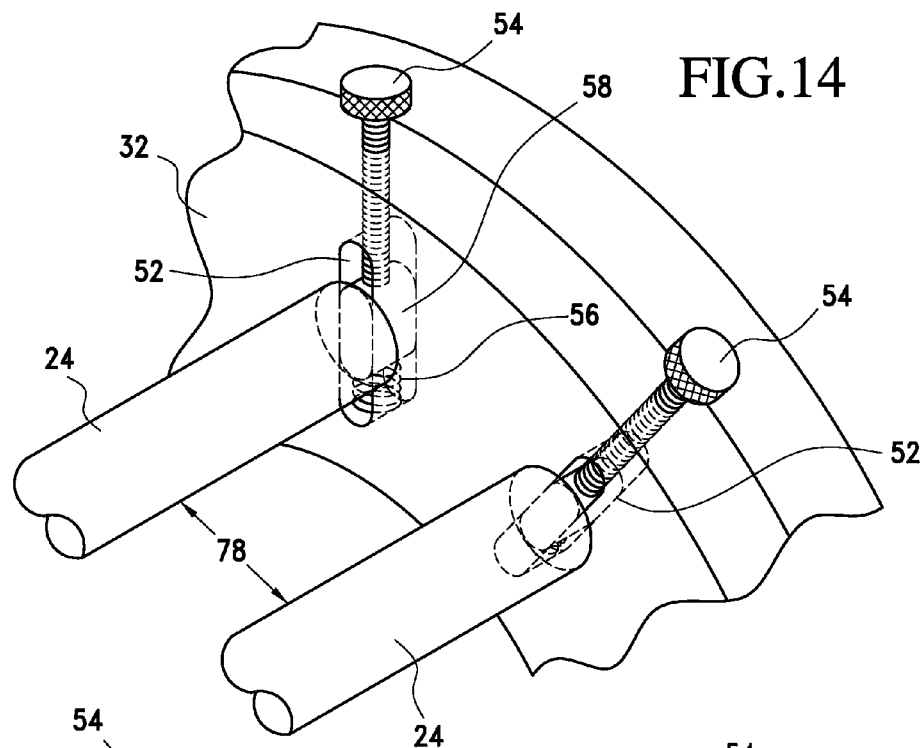
FIG. 14 is a partial isometric view of an embodiment of the present invention that includes adjustable guide rod spring-loaded members.
Figure 15:
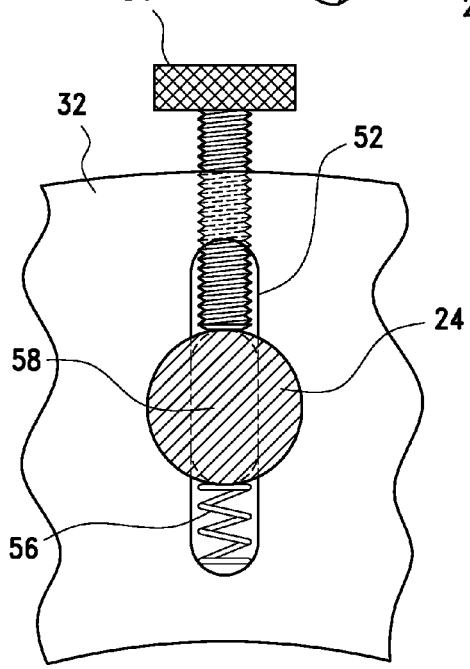
FIG. 15 is a partial top view of FIG. 14.
Figure 16:
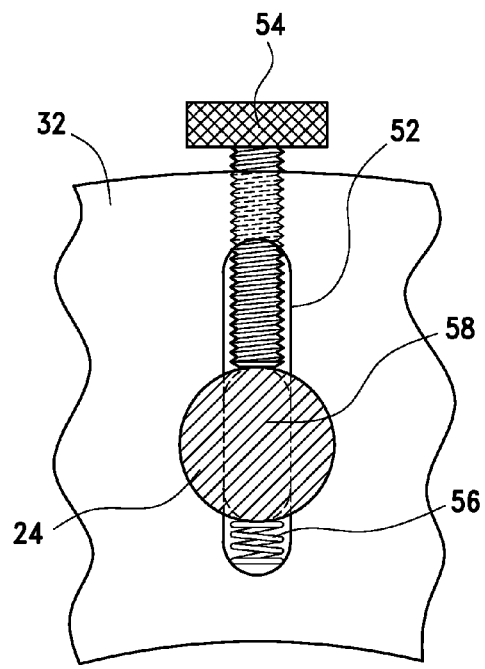
FIG. 16 is an alternative partial top view of FIG. 14.
Figure 21:
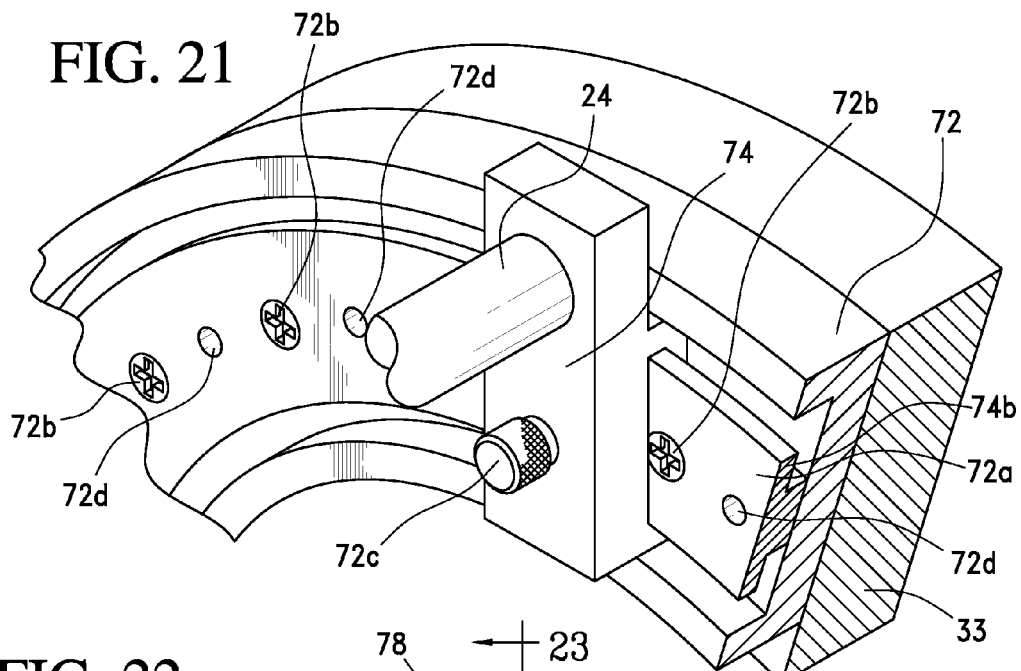
FIG. 21 is a partial isometric view of an embodiment of the present invention that includes guide rod slider members for adjusting the position and number of guide rods along a track.
Figure 22:
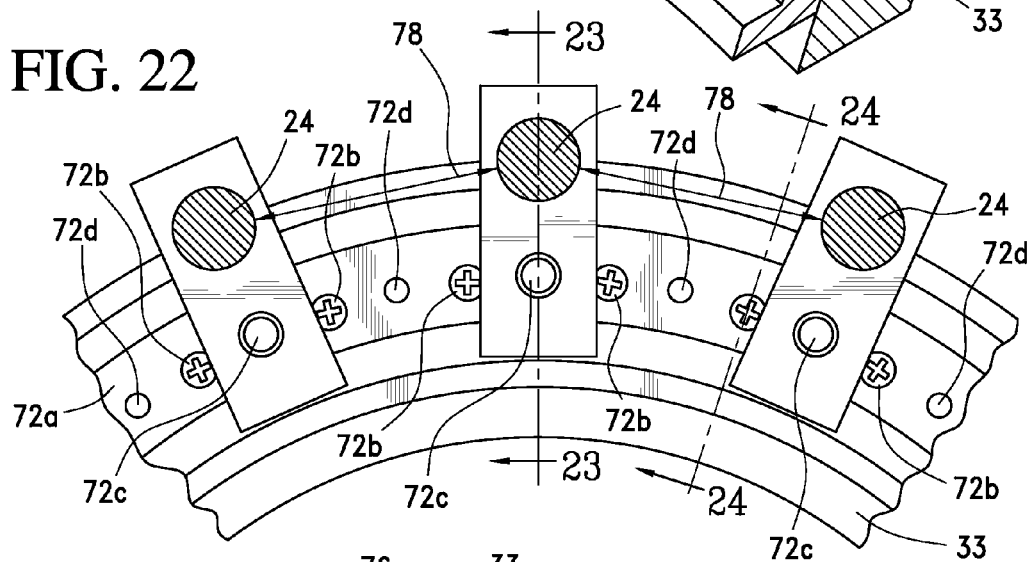
FIG. 22 is a partial top view of FIG. 21.

FIGS. 14-16 illustrate an alternative configuration of the ends of the guide rods 24. A guide rod end tab 58 is provided on the end of each guide rod 24. The guide rod end tab 58 slides inwardly and outwardly in the guide rod slot 52. The inward and outward adjustment allows the guide rods 24 to accommodate different diameter tubular cores C or tubular cores C that have existing layers on them that increases their overall diameter. A guide rod adjustment spring 56 is positioned on one side of guide rod end tab 58 in the guide rod slot 52. A guide rod adjustment bolt 54 is threaded into the entry flange and engages the side of the guide rod end tab 58 opposite the guide rod adjustment spring 56. Thus, the guide rod adjustment spring 56 urges the guide rod end tab 58 and guide rod 24 toward the guide rod adjustment bolt 54. FIG. 15 shows the guide rod 24 and its guide rod end tab 58 in an outward position with the guide rod adjustment spring 56 in an extended state, while FIG. 16 shows the guide rod 24 and its guide rod end tab 58 in an inward position with the guide rod adjustment spring 56 in a compressed state. Although the guide rods 24, the guide rod end tabs 58, the guide rod adjustment spring 56 and the guide rod adjustment bolt 54 are shown assembled on the entry flange 32, the assembly of the guide rods 24, the guide rod end tabs 58, the guide rod adjustment spring 56 and the guide rod adjustment bolt 54, the same assembly is typically also provided on the opposite end of the guide rods 24 on the exit flange 34.

FIGS. 17-20 illustrate an additional alternative configuration of the guide spool G. Each guide rod 24 is connected to a guide rod segment 62 with a guide rod mounting bolt 62b. Each guide rod segment 62 is secured to the entry flange 32 with a guide rod segment set screw 64. Each segment 62 slides on the inner surface 63a of the channel 63, as shown in cross section in FIG. 20. The channel 63 is bolted or otherwise fastened to the entry guide bushing 33. A spacer segment 62a is typically positioned between each guide rod segment 62 and the width of each spacer segment 62a can be varied, depending upon the desired spacing of the guide rods 24. The number and spacing of the guide rods 24 can be changed depending upon how many tape stacks T will be fed through the gaps 78 between adjacent guide rods 24. For example, if 15 tape stacks T will be fed, each guide rod 24 will be positioned at 24 degree intervals around the circumference of the entry guide bushing 33. Although the guide rods 24, the segments 62, the spacer segment 62a, the set screws 64 and the channel 63 are shown assembled on the entry guide bushing 33, the same assembly is typically also provided on the opposite ends of the guide rods 24 on the exit guide bushing 35.

Figure 23:
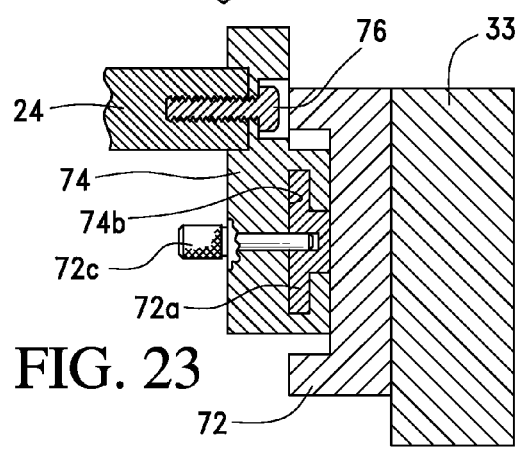
FIG. 23 is a sectional view taken along the lines 23-23 in FIG. 22.
Figure 24:
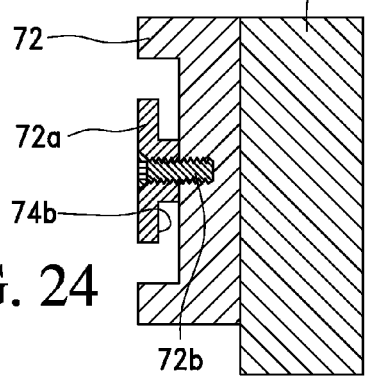
FIG. 24 is a sectional view taken along the lines 24-24 in FIG. 22.

FIGS. 21-24 illustrate an additional alternative configuration of the guide spool G. Each guide rod 24 is secured to a guide rod slider 74 with a guide rod mounting bolt 76 (as shown in FIG. 23) or other suitable fastener. Each guide rod slider 74 includes a channel 74b (seen in cross section in FIG. 23) that is slidably mounted to a track 72a. The channel block 72 and track 72a are attached to the entry guide bushing 33 with track mounting screws 72b. The guide rod sliders 74 slide along the tracks 72a to position the guide rods in any desired position. Slider pins 72c are inserted into each guide rod slider 74 and fit into the slider pin holes 72d to secure the guide rod slider and corresponding guide rod 24 into position. The number of guide rod sliders 74 and guide rods 24 can be varied as desired.

Although the guide rods 24, the guide rod sliders 74, the channel blocks 72, the tracks 72a and related components are shown assembled on the entry guide bushing 33, the same assembly is typically also provided on the opposite ends of the guide rods 24 on the exit guide bushing 35.

The foregoing disclosure and description of the invention are illustrative and explanatory thereof, and various changes in the details of the illustrated apparatus and construction and method of operation may be made without departing from the spirit or scope of the invention as claimed.

What is claimed is:

1. A guide spool to position tape stacks on a tubular member comprising:
    a plurality of guide rods having a proximal and a distal end;
    the proximal end of said guide rods extending from a first rotatable flange member;
    a first tape stack retaining member positioned on each of said guide rods; and
    a second tape stack retaining member on each of said guide rods separated from each of said first tape stack retaining members thereby defining a gap between adjacent guide rods and between each said first tape stack retaining member and each said second tape stack retaining member through which the tape stacks pass,
    wherein said second tape stack retaining member comprises a pin member positioned substantially in line with each of said first tape stack retaining members.

2. A guide spool according to claim 1 wherein the distal end of each of said guide rods extends from a second rotatable flange member.

3. A guide spool according to claim 2 wherein a guide bushing is attached to said first rotatable flange member for positioning the tubular member within said guide spool.

4. A guide spool according to claim 2 wherein a guide bushing is attached to said second rotatable flange member for positioning the tubular member within said guide spool.

5. A guide spool according to claim 1 wherein the position of said proximal ends of said guide rods approximates a circular shape on said first rotatable flange member.

6. A guide spool according to claim 1 wherein said first tape stack retaining member comprises a blade having an end facing substantially in the direction of said second tape stack retaining member.

7. A guide spool according to claim 6 wherein said blades are connected to said guide rods with a collar member; said collar member comprising;
    a bore through which said guide rods extend; and
    a flat face on which said blades are mounted whereby said blades extend along the top surface of said guide rods.

8. A guide spool according to claim 1 wherein the proximal end of each of said guide rods is connected to said first flange member with a rotatable pivot arm and the distal end of each of said guide rods is connected to said second flange member with a rotatable pivot arm whereby the distance of said guide rods can be moved inwardly and outwardly relative to the rotational axis of the tubular member.

9. A guide spool according to claim 1 wherein the proximal end of each of said guide rods includes a tab slidably engaged with a slot in said first rotatable flange member and the distal end of each of said guide rods includes a tab slidably engaged with a slot in a second rotatable flange member whereby the distance of said guide rods can be moved inwardly and outwardly relative to the rotational axis of the tubular member.

10. A guide spool according to claim 9 wherein a spring is positioned on at least one side of each of said tabs and an adjustment bolt is positioned on the other at least one side of said tabs whereby said spring urges said tabs toward said adjustment bolt and whereby said guide rod can be adjustably secured into a desired position with said adjustment bolt.

11. A guide spool according to claim 1 wherein the proximal end of each of said guide rods is connected to a segment member slidably engaged with said first rotatable flange member and the distal end of said guide rods is connected to a segment member slidably engaged with said second rotatable flange member whereby the spacing and number of said guide rods can be changed about said first and second rotatable flange members.

12. A guide spool to position tape stacks on a tubular member comprising:
    a plurality of guide rods having a proximal and a distal end;
    the proximal end of said guide rods extending from a first rotatable flange member;
    a first tape stack retaining member positioned on each of said guide rods; and
    a second tape stack retaining member on each of said guide rods separated from each of said first tape stack retaining members thereby defining a gap between adjacent guide rods and between each said first tape stack retaining member and each said second tape stack retaining member through which the tape stacks pass,
    wherein said first tape stack retaining member comprises a blade having an end facing substantially in the direction of said second tape stack retaining member, and
    wherein said blades are connected to said guide rods with a collar member, said collar member comprising:
    a bore through which said guide rods extend; and
    a flat face on which said blades are mounted whereby said blades extend along the top surface of said guide rods.

13. The guide spool of claim 12, wherein the distal end of each of said guide rods extends from a second rotatable flange member.

14. The guide spool of claim 13, wherein a guide bushing is attached to said first rotatable flange member for positioning the tubular member within said guide spool.

15. The guide spool of claim 13, wherein a guide bushing is attached to said second rotatable flange member for positioning the tubular member within said guide spool.

16. The guide spool of claim 12, wherein the position of said proximal ends of said guide rods approximates a circular shape on said first rotatable flange member.

17. The guide spool of claim 12, wherein the proximal end of each of said guide rods is connected to said first flange member with a rotatable pivot arm and the distal end of each of said guide rods is connected to said second flange member with a rotatable pivot arm whereby the distance of said guide rods can be moved inwardly and outwardly relative to the rotational axis of the tubular member.

18. The guide spool of claim 12, wherein the proximal end of each of said guide rods includes a tab slidably engaged with a slot in said first rotatable flange member and the distal end of each of said guide rods includes a tab slidably engaged with a slot in a second rotatable flange member whereby the distance of said guide rods can be moved inwardly and outwardly relative to the rotational axis of the tubular member.

19. The guide spool of claim 18, wherein a spring is positioned on at least one side of each of said tabs and an adjustment bolt is positioned on the other at least one side of said tabs whereby said spring urges said tabs toward said adjustment bolt and whereby said guide rod can be adjustably secured into a desired position with said adjustment bolt.

20. The guide spool of claim 12, wherein the proximal end of each of said guide rods is connected to a segment member slidably engaged with said first rotatable flange member and the distal end of said guide rods is connected to a segment member slidably engaged with said second rotatable flange member whereby the spacing and number of said guide rods can be changed about said first and second rotatable flange members.

* * * * *